United States Patent Office 3,223,842
Patented Dec. 14, 1965

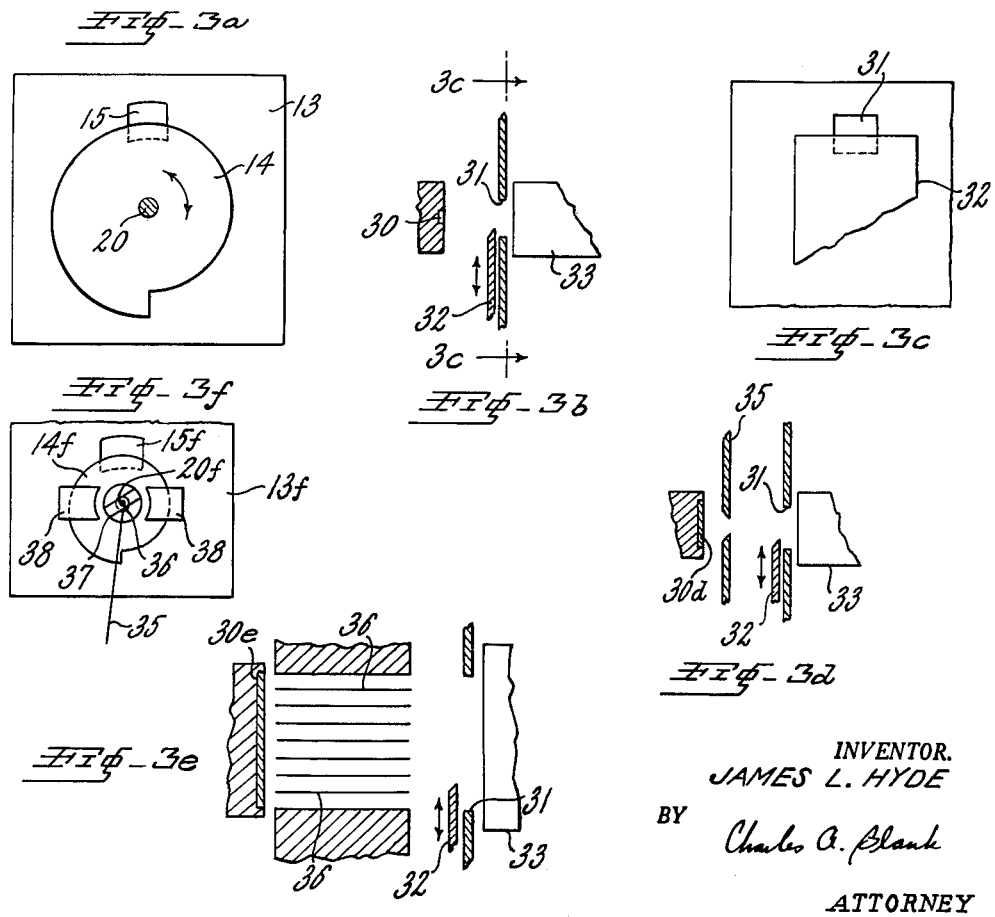

3,223,842
DIGITAL MEASURING APPARATUS UTILIZING A RADIOACTIVE SOURCE AND DETECTOR
James L. Hyde, Little Neck Road, R.F.D. 5, Huntington, N.Y.
Filed Mar. 15, 1962, Ser. No. 180,050
7 Claims. (Cl. 250—83.3)

This invention relates to measuring apparatus, and more particularly, to measuring apparatus for developing an output signal representing a physical variable such as pressure, temperature, or acceleration which may be sensed through a mechanical displacement.

Measuring apparatus heretofore proposed has, in general, been subject to various inaccuracies or limitations. For example, electronic apparatus is generally subject to changes in circuit parameters due to variations in operating conditions resulting in output signal inaccuracies or drift.

Prior measuring apparatus utilizing nuclear or radioactive energy sources has been subject to the limitation that the apparatus develops analog output signals subject to inaccuracies due to electronic circuit instabilities effecting the magnitude and thus the accuracy of the output signals. Moreover, output signals which vary linearly with or in proportion to an input variable have not ordinarily been provided by energy transducers utilizing a radioactive energy source.

Further, prior analog-to-frequency signal converters usually utilize voltage-controlled oscillators which are subject to instabilities due to variations of operating conditions.

It is an object of the invention, therefore, to provide a new and improved measuring apparatus.

It is another object of the invention to provide a new measuring apparatus having improved accuracy.

It is another object of the invention to provide a new and improved digital measuring apparatus providing digital signals translatable entirely in pulse-coded digital form.

It is another object of the invention to provide a stable digital measuring apparatus.

It is another object of the invention to provide a new and improved digital energy transducer for measuring apparatus.

It is another object of the invention to provide a new and improved stable analog-to-frequency signal converter.

In accordance with the invention, digital measuring apparatus comprises a radioactive energy source and means controlled by a variable to be measured for providing pulses representing the radiation particles and having a pulse rate which varies in accordance with the variable to be measured. The apparatus also includes terminal utilizing means responsive to the electrical pulses for developing digital output signals representing the variable.

For a better understanding of the present invention, together with other and further objects thereof, reference is made to the following description taken in connection with the accompanying drawings, and its scope will be pointed out in the appended claims.

Referring now to the drawings, FIG. 1 is a schematic block diagram of a digital measuring apparatus constructed in accordance with the invention;

FIG. 2 is a view in section, partly diagrammatic, of a portion of the FIG. 1 apparatus; and FIGS. 3a to 3f, inclusive, are diagrammatic representations of various transducers constructed in accordance with the invention.

Referring now more particularly to FIG. 1 of the drawings, measuring apparatus constructed in accordance with the invention comprises a nuclear or radioactive energy source 10 which may emit, for example, alpha, or beta particles or gamma rays. Typically the nuclear source may be strontium 90 which emits beta particles or polonium 210 which emits alpha particles. The source 10 preferably is a point source which is collimated through collimator opening 10a to produce a substantially parallel beam of particles. A radioactive source having a magnitude of the order of 10 to 1000 microcuries is suitable for many applications.

The particles emitted by the source 10 are directed to means 11 controlled by a variable to be measured for providing electrical pulses representing the radiation particles and generating a pulse rate which varies in accordance with the variable to be measured. More particularly, the means 11 comprises a radiation shield having a displaceable member controlled in position by a variable to be measured for controlling the rate of radiation particles transmitted through the shield, as will be more fully described subsequently. The means 11 also comprises a radiation detector 12 providing individual electrical pulses representative of the individual radiation particles transmitted through the shield.

Referring more particularly to FIG. 2, there is represented a pressure-responsive transducer in which the radiation shield comprises, for example, a dense metal shield 13 having a displaceable member 14 controlling the width of an aperture 15 for transmitting particles emitted by a source 10. The displaceable member is in the form of a rotatable spiral cam shutter 14 positioned between the aperture 15 and the source 10, as represented in FIG. 3a. Referring again to FIG. 2, rotation of the shutter 14 controls the rate of radiation particles transmitted through the aperture. The source 10 may be enclosed in an adjustably positioned capsule 16.

The cam shutter 14 is mounted on a rotatable central shaft 20. The periphery of the cam shutter 14 is attached to and is rotatable under the control of a helical Bourdon tube such as manufactured by Glassco Instrument Co., Pasadena, California or other Bourdon tube of conventional construction. The Bourdon tube deforms and rotates the shutter 14 in accordance with pressure applied to the Bourdon tube through aperture 15.

The radiation detector 12 may be a Geiger tube of conventional construction positioned in line with the aperture 15 and source 10 to develop electrical output pulses individually representative of the individual radiation particles transmitted through the aperture. The Geiger tube preferably is of the thin window type having a window thickness of 1 to 3 milligrams per square centimeter. Any suitable radiation detector, such as a semiconductor particle detector, may be used in lieu of a Geiger tube.

Referring again to FIG. 1, there is coupled to the radiation detector 12 terminal utilizing means responsive to the individual electrical pulses for developing output signals comprising a digital representation of the rate of individual radiation particles transmitted through the shield and thus comprising a digital representation of the variable. This terminal utilizing means may be a digital frequency counter or pulse counter 25 of a conventional type providing a digital count over a preset time base of the pulses applied thereto and a digital signal output or digital readout. Such a digital frequency counter may be of a type manufactured by Beckman Instruments, Inc., Richmond, California. The digital readout or signal output may be for example, visual digital signals or electrical or magnetic pulse-coded signals, such as binary pulse-coded signals. The terminal utilizing means may, for example, also include a magnetic tape or a digital telemetering output circuit. The terminal utilizing means develops output signals for the measuring of apparatus and is not utilized merely to convert the pulses internally within the apparatus to an analog signal.

Other transducers similar to the FIG. 1 transducer and constructed in accordance with the present invention are represented diagrammatically in FIGS. 3b to 3e. Referring to FIGS. 3b and 3c, a radioactive point source 30 may be utilized in proximity to a shield having an aperture 31 which may be adjusted by a linearly displaceable shutter 32 for determining the rate of particles which strike radiation detector 33. The aperture 31 effectively acts as a collimator to pass substantially parallel rays of the beam of particles toward the detector 33. The dimensions of the aperture, which may be rectangular, and the shape of the shutter, which may have a straight leading edge, preferably are so determined that the area of the aperture is adjusted linearly with respect to variations of the variable to be measured. Thus, the rate of radioactive particles transmitted through the aperture preferably varies linearly with displacements of the shutter. For some applications it may be desirable that the rate of particles transmitted through the aperture varies as a nonlinear function of displacement of the shutter and the dimensions of the aperture and the shape of the shutter may be designed accordingly.

As represented in FIG. 3d, a source 30d other than a point source, in conjunction with a collimator 35 having an aperture of small dimensions may be utilized to provide a beam of particles having substantially parallel rays. Another form of collimator is represented in FIG. 3e comprising a series of substantially parallel plates 36 which are opaque to radiation and are effective to cause the beam to have substantially plane-parallel rays, that is rays lying substantially entirely in planes perpendicular to the plane of the shutter and parallel to the leading edge of the shutter. At least such substantial plane parallelism of rays is necessary in order to provide a particle rate through the aperture varying linearly with variations of the input variable. Alternatively, a parallel bundle of thin-walled opaque tubes can be utilized to provide a beam which has substantially parallel rays in three dimensions. The radiation flux may be defined as the number of particles per second passing through an area of a square centimeter. Thus, linearity of the particle rate through the aperture, and thus of the final digital representation, with variations of the input variable can be obtained when the flux gradient through the aperture is substantially zero in the direction of motion of the shutter.

FIG. 3f represents a digital transducer for an analog-to-frequency signal converted. The transducer includes a moving coil galvanometer having input leads 35 electrically connected through conductive springs 36 (only one of which is shown in the drawing) to a rotatable winding 37 mounted on a rotatable shaft 20f within a suitable magnet assembly 38 for controlling the position of a cam shutter 14f across an aperture 15f in ressponse to an analog electrical input signal. Rotation of the shutter 14f controls the rate of radiation particles transmitted from a suitable nuclear source through the aperture to a radiation detector and frequency counter, as represented in FIG. 1.

From the foregoing description it will be apparent that measuring apparatus constructed in accordance with the invention has the advantage that the information representing the variable to be measured can be translated entirely in digital form, thereby providing high output signal accuracy with minimum equipment. The apparatus includes a digital transducer of an extremely stable nature. Moreover, the transducer is capable of providing an output signal which varies linearly with the variations of the input variable.

While there have been described what are at present believed to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. Digital measuring apparatus comprising: a radioactive particle source; a radiation shield having an effective aperture area and having a displaceable shutter in proximity to said aperture area and controlled in position by a variable to be measured for controlling the rate of radiation particles transmitted through said shield; the flux gradient of the particles emitted by said source being substantially zero through said effective aperture area in the direction of motion of said shutter; a radiation detector providing individual electrical pulses representative of the individual radiation particles transmitted through said shield; and terminal utilizing means responsive to said individual electrical pulses for developing output signals comprising a digital representation of the rate of said individual radiation particles transmitted through said shield and thus comprising a digital representaton of said variable.

2. Digital measuring apparatus comprising: a radioactive energy source emitting radiation particles in a beam having substantially parallel rays; a radiation shield having a displaceable shutter controlled in position by a variable to be measured and having in proximity to said shutter an effective aperture area which is linearly adjustable with displacement of said displaceable shutter for controlling the rate of radiation particles transmitted through said shield; a radiation detector providing individual electrical pulses representative of the individual radation particles transmitted through said shield; and terminal utilizing means responsive to said individual electrical pulses for developing output signals comprising a digital representation of the rate of said individual radiation particles transmitted through said shield and thus comprising a digital representation varying linearly with said variable.

3. Digital measuring apparatus comprising: a radioactive particle source; a radiation shield having an effective aperture area and having a displaceable shutter in proximity to said effective aperture area and controlled in position by a variable to be measured for controlling the rate of radiation particles transmitted through said shield; the flux gradient of the particles emitted by said source being substantially zero through said effective aperture area in the direction of motion of said shutter; a radiation detector providing individual electrical pulses representative of the individual radiation particles transmitted through said shield; and a digital frequency counter responsive to said individual electrical pulses for developing output signals comprising a digital representation of the rate of said individual radiation particles transmitted through said shield and thus comprising a digital representation of said variable.

4. A digital energy transducer for measuring apparatus comprising: a radioactive particle source; a radiation shield having an effective aperture area and having a displaceable shutter in proximity to said effective aperture area and controlled in position by a variable to be measured, said effective aperture area being adjustable with displacement of said shutter for controlling the rate of radiation particles transmitted through said shield; the flux gradient of the particles emitted by said source being substantially zero through said effective aperture area in the direction of motion of said shutter; and a radiation detector providing individual electrical pulses representative of the individual radiation particles transmitted through said shield.

5. A digital energy transducer for measuring apparatus comprising: a radioactive particle source; a radiation shield having an effective aperture area and having a displaceable shutter in proximity to said effective aperture area and controlled in position by a variable to be measured, the flux gradient of the particles emitted by said source being substantially zero through said effective aperture area in the direction of motion of said shutter, said effective aperture area being linearly adjustable with displacement of said shutter for controlling the rate of radiation particles transmitted through said shield; and a radiation detector providing individual electrical pulses representative of the individual radiation particles transmitted through said shield.

6. A digital energy transducer for an analog-to-frequency system converter comprising: means for supplying an analog electrical input signal; a galvanometer including a moving coil positioned in response to said input signal; a radioactive particle source; a radiation shield having a displaceable member controlled in position by said moving coil and having an effective aperture area adjustable with displacement of said displaceable member for controlling the rate of radiation particles transmitted through said shield, the flux gradient of the particles emitted by said source being substantially zero through said effective aperture area in the direction of motion of said shutter; and a radiation detector providing individual electrical pulses representative of the individual radiation particles transmitted through said shield.

7. A digital energy transducer for measuring apparatus comprising: a radioactive particle source; a radiation shield having an effective aperture area and having a rotatable shutter in proximity to said effective aperture area and controlled in position by a variable to be measured, said effective aperture area being adjustable with rotation of said shutter for controlling the rate of radiation particles transmitted through said shield; the flux gradient of the particle emitted by said source being substantially zero through said effective aperture area in the direction of motion of said shutter; and a radiation detector providing individual electrical pulses representative of the individual radiation particles transmitted through said shield.

References Cited by the Examiner
UNITED STATES PATENTS

| | | | |
|---|---|---|---|
| 2,546,984 | 4/1951 | Deloraine et al. | 250—83.6 X |
| 2,883,555 | 4/1959 | London | 250—83.3 X |
| 2,884,536 | 4/1959 | Swift | 250—83.3 X |
| 3,024,364 | 3/1962 | Wanetick | 250—83.3 |
| 3,028,498 | 4/1962 | Meyer | 250—106 |

RALPH G. NILSON, *Primary Examiner.*

ARCHIE R. BORCHELT, *Examiner.*